US012785502B2

(12) United States Patent
Burdick et al.

(10) Patent No.: US 12,785,502 B2
(45) Date of Patent: Nov. 3, 2026

(54) PERMANENT MAGNET MOTOR ASSEMBLY FOR HEAT REJECTION EQUIPMENT

(71) Applicant: SPX Cooling Technologies, Inc., Overland Park, KS (US)

(72) Inventors: Larry Burdick, Olathe, KS (US); Jerome Jennings, Overland Park, KS (US); Robert Lewis, Overland Park, KS (US); Glenn Brenneke, Lee's Summit, MO (US)

( * ) Notice: Subject to any disclaimer, the term of this patent is extended or adjusted under 35 U.S.C. 154(b) by 371 days.

(21) Appl. No.: 18/502,958

(22) Filed: Nov. 6, 2023

(65) Prior Publication Data

US 2024/0154495 A1 May 9, 2024

Related U.S. Application Data

(60) Provisional application No. 63/382,432, filed on Nov. 4, 2022.

(51) Int. Cl.
*H02K 7/14* (2006.01)
*H02K 5/16* (2006.01)

(52) U.S. Cl.
CPC ............... *H02K 7/14* (2013.01); *H02K 5/161* (2013.01)

(58) Field of Classification Search
CPC ...... H02K 2213/03; H02K 5/04; H02K 5/161; H02K 7/08; H02K 7/116; H02K 7/14
See application file for complete search history.

(56) References Cited

U.S. PATENT DOCUMENTS 5,877,576 A * 3/1999 CoChimin ............... H02K 5/18 363/145
6,011,335 A * 1/2000 Belley ...................... H02K 5/06 310/71
9,407,124 B2 * 8/2016 Minari ................... H02K 5/225
10,742,089 B2 * 8/2020 Schmidt ................... H02K 5/26
2010/0150748 A1 * 6/2010 McElveen ................ H02K 5/18 29/401.1
2016/0156245 A1 * 6/2016 Pearce, Jr. ............... H02K 5/15 310/425
2018/0051667 A1 * 2/2018 Yang ...................... H02K 7/116

* cited by examiner

*Primary Examiner* — Naishadh N Desai
(74) *Attorney, Agent, or Firm* — Husch Blackwell LLP

(57) ABSTRACT

A permanent magnet (PM) motor is provided to facilitate air movement through heat rejection equipment. The PM motor has a body, an upper bearing housing positioned on and extending upwardly from a top surface of the body, a shaft connected to and extending from the upper bearing housing and in communication with a fan, and a lower bearing housing positioned on and extending downwardly from a bottom surface of the body opposite the top surface. The PM motor further includes a mounting assembly having at least three discrete legs disposed on a lower end of the body and extending outwardly from the body.

20 Claims, 6 Drawing Sheets

PERMANENT MAGNET MOTOR ASSEMBLY FOR HEAT REJECTION EQUIPMENT

TECHNICAL FIELD

This disclosure generally relates to permanent magnet motors. More particularly, the disclosure relates to a permanent magnet motor assembly designed to replace a conventional motor and gear reducer assembly.

BACKGROUND

Various motors are used to drive industrial air movement devices such as heat rejection equipment fans. Conventionally, induction motors may be used in heat rejection equipment fan applications due to their simple and rugged design. However, a drawback of induction motors is that it may be difficult to control the speed of the motor, and the motor may have a low starting torque. Thus, a gear drive or reducer may be used to increase the available output torque of the induction motor without needing to increase the power consumption of the motor. Generally, the gear drive is positioned between the induction motor and the heat rejection equipment fan. Thus, drive train configurations utilizing an induction motor assembly require additional components to connect the motor to the gear drive, and the gear drive to the heat rejection equipment fan. Therefore, drive train configurations utilizing induction motors may have a higher overall cost and be susceptible to mechanical failures.

Alternatively, heat rejection equipment fan applications may use a permanent magnet (PM) motor. A PM motor can directly drive the fan, eliminating several components of the induction motor configuration, such as the gear drive, a drive shaft, bearings, and couplings. As such, the footprint of a drive train utilizing a PM motor assembly is typically smaller than that of induction motor assemblies. Moreover, there may be less cost associated with PM motor installation because there may be fewer components than induction motor assemblies. Further, with fewer components, there may be fewer potential points of failure. However, many industrial applications, such as heat rejection equipment fans, are specifically designed to function with induction motor assemblies. Consequently, if a consumer wishes to replace an induction motor with a PM motor, it is unlikely that the consumer will be able to find a PM motor suitable for the specific application. Thus, the consumer may need to invest additional time, money, and resources into retrofitting an application to work with a new PM motor.

Therefore, there is a need for a cost-effective PM motor assembly or kit that can replace an induction motor assembly defined by a footprint having one or more connection points, a height dimension, a width dimension, and a depth dimension designed to fit within a conventional induction motor assembly footprint.

SUMMARY

A PM (permanent magnet) motor is provided. In one embodiment, the PM motor comprises a body, an upper bearing house positioned on a top surface of the body, a shaft connected to and extending from the upper bearing house, a water slinger positioned around a lower portion of the shaft, a lower bearing housing positioned on a bottom surface of the body opposite the top surface, and a mounting assembly connected to the bottom surface of the body.

In one embodiment, the PM motor has an overall height dimension of about 10 centimeters to about 100 centimeters, or about 50 centimeters to about 75 centimeters, or about 60 centimeters. In one embodiment, the PM motor has an overall height dimension of about 82 cm to about 87 cm.

In one embodiment, the body of the PM motor includes a first plurality of fins. In one embodiment, the lower bearing housing includes a second plurality of fins.

In one embodiment, the mounting assembly comprises a first leg attached to a first side of the PM motor, a second leg attached to a second side of the PM motor opposite the first side, and a third leg attached to a third side of the PM motor between the first side and the second side.

In one embodiment, the first leg and the second leg each include an attachment point. In some aspects, each of the first leg and the second leg are imparted with two attachment points. In one embodiment, the third leg includes two attachment points.

In one embodiment, a permanent magnet motor to facilitate air movement through heat rejection equipment is provided. The permanent magnet motor includes a body, an upper bearing housing positioned on and extending upwardly from a top surface of the body, a shaft connected to and extending from the upper bearing housing and in communication with a fan, a lower bearing housing positioned on and extending downwardly from a bottom surface of the body opposite the top surface, and a mounting assembly having at least three discrete legs disposed on a lower end of the body and extending outwardly from the body.

In some embodiments, the permanent magnet motor includes a water slinger substantially disposed between the upper bearing housing and the shaft. The motor includes a first plurality of fins connected to and protruding outwardly from a surface of the body, and a second plurality of fins connected to and protruding outwardly from the lower bearing housing, wherein the second plurality of fins is offset from the first plurality of fins and is imparted with a different shape with respect to the first plurality of fins. The mounting assembly encircles at least a portion of the lower bearing housing and extends outwardly therefrom.

In one embodiment, at least two of the three discrete legs are positioned on opposing sides of the body, and each of the three discrete legs is oriented in alignment with the shaft. Each of the three discrete legs includes at least one attachment point designed to couple the permanent magnet motor to the heat rejection equipment. At least one attachment point of one leg is positioned a first distance from the shaft and the at least one attachment point of another leg is positioned a second distance further from the shaft than the at least one attachment point of the first leg. At least one attachment point of one leg is positioned a first distance from the shaft and the at least one attachment point of another leg is positioned at the first distance. The motor also includes a control box for providing power to the motor and protruding outwardly from a side of the body.

In one embodiment, a permanent magnet motor provided as a retrofit kit for an induction motor assembly is provided. The motor includes a cylindrical body at least partially enclosing at least one component of the permanent magnet motor, an upper bearing housing protruding upwardly from an upper portion of the body, a shaft extending upwardly from the upper bearing housing, a lower bearing housing protruding downwardly from a lower end of the body, and a mounting assembly disposed on a lower end of the body and substantially encircling and extending outwardly from the lower bearing housing, wherein the volumetric footprint defining the permanent magnet motor is substantially equivalent to, or less than the volumetric footprint of the induction motor assembly.

In some embodiments, the permanent magnet motor is defined by a first height dimension, and the induction motor assembly is defined by a second height dimension that is equal to or greater than the first height dimension of the permanent magnet motor.

In one embodiment, the induction motor assembly comprises a first set of attachment points and the mounting assembly of the permanent magnet motor comprises a second set of attachment points designed to align with the first set of attachment points. The PM motor also includes a water slinger substantially disposed between the upper bearing housing and the shaft. The shaft provides alignment and a clearance between the upper bearing housing and a fan. The mounting assembly comprises three discrete legs extending outwardly from the body or the lower bearing housing. The lower bearing housing supports a rotary bearing disposed therein, the rotary bearing is designed to support axial and thrust loads equal to or greater than the induction motor gear drive.

In one embodiment, a method of replacing an induction motor having a gear drive in heat rejection equipment is provided. The method includes removing the induction motor having a first height dimension and providing a permanent magnet motor having a second height dimension that is less than or equal to the first height dimension. The permanent magnet motor includes a body, an upper bearing housing positioned on a top surface of the body, a shaft connected to and extending from the upper bearing housing, a lower bearing housing positioned on a bottom surface of the body opposite the top surface, and a mounting assembly disposed on a lower end of the body and configured to couple the permanent magnet motor kit to the heat rejection equipment. The method also includes replacing the induction motor having the gear drive with the permanent magnet motor. The method further includes mounting the permanent magnet motor to the heat rejection equipment by aligning a set of attachment points of the induction motor gear drive with another set of attachment points of the permanent magnet motor, and coupling the permanent magnet motor to the heat rejection equipment with at least one coupling mechanism. The mounting assembly has at least three discrete legs disposed on the lower end of the body, and at least one of the three discrete legs is imparted with a wider cross-sectional profile than the other two discrete legs.

DETAILED DESCRIPTION

Figure 1A:
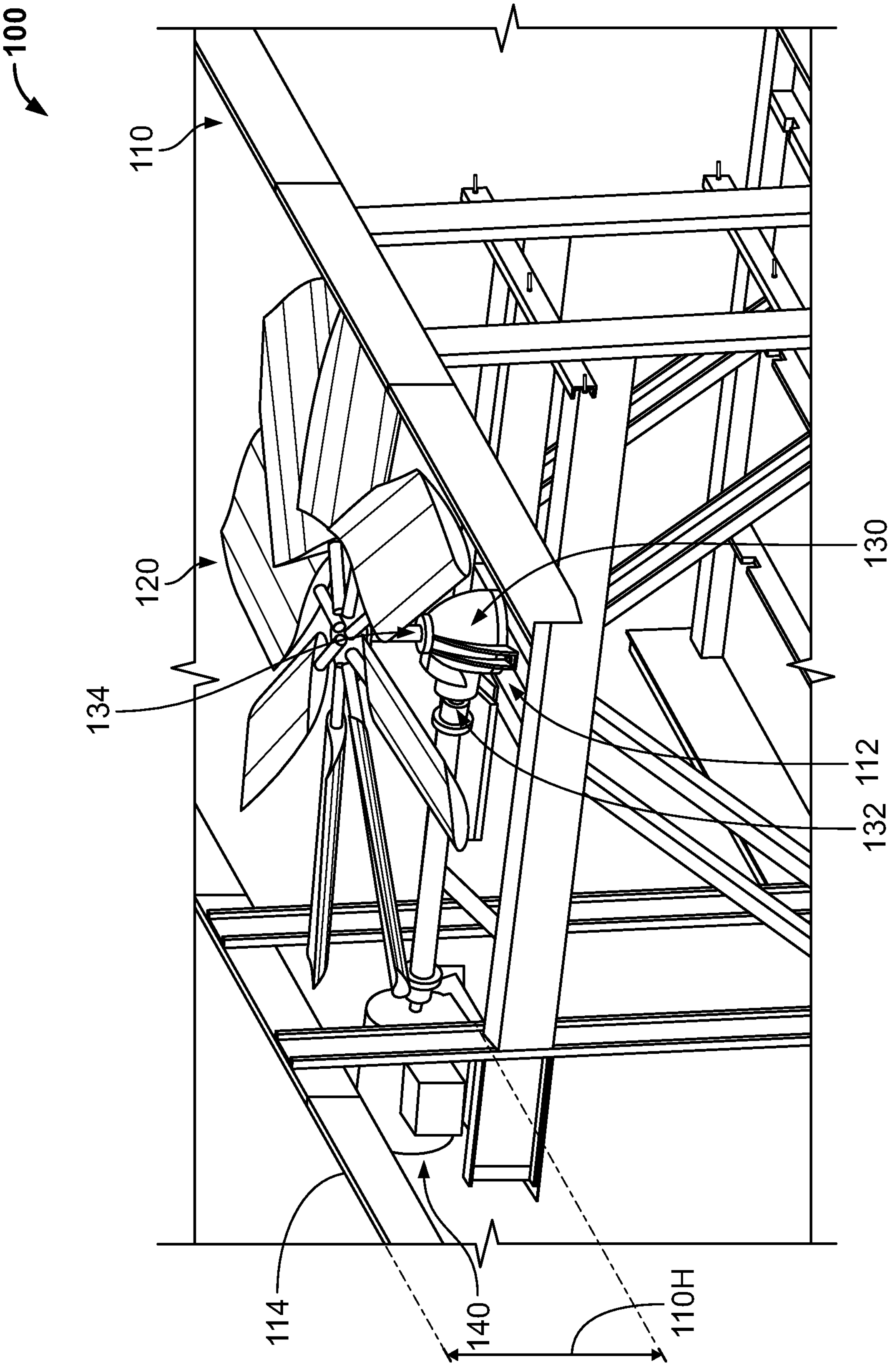
FIG. 1A is a top isometric view of a portion of a conventional cooling tower fan assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," "having," and variations thereof herein is meant to encompass the items listed thereafter and equivalents thereof as well as additional items. In order to avoid any doubt, all embodiments claimed through the use of the term "comprising" may include any additional components, unless stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term or, unless stated otherwise, refers to the listed members individually as well as in any combination. Use of the singular includes use of the plural and vice versa.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from the embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1B:
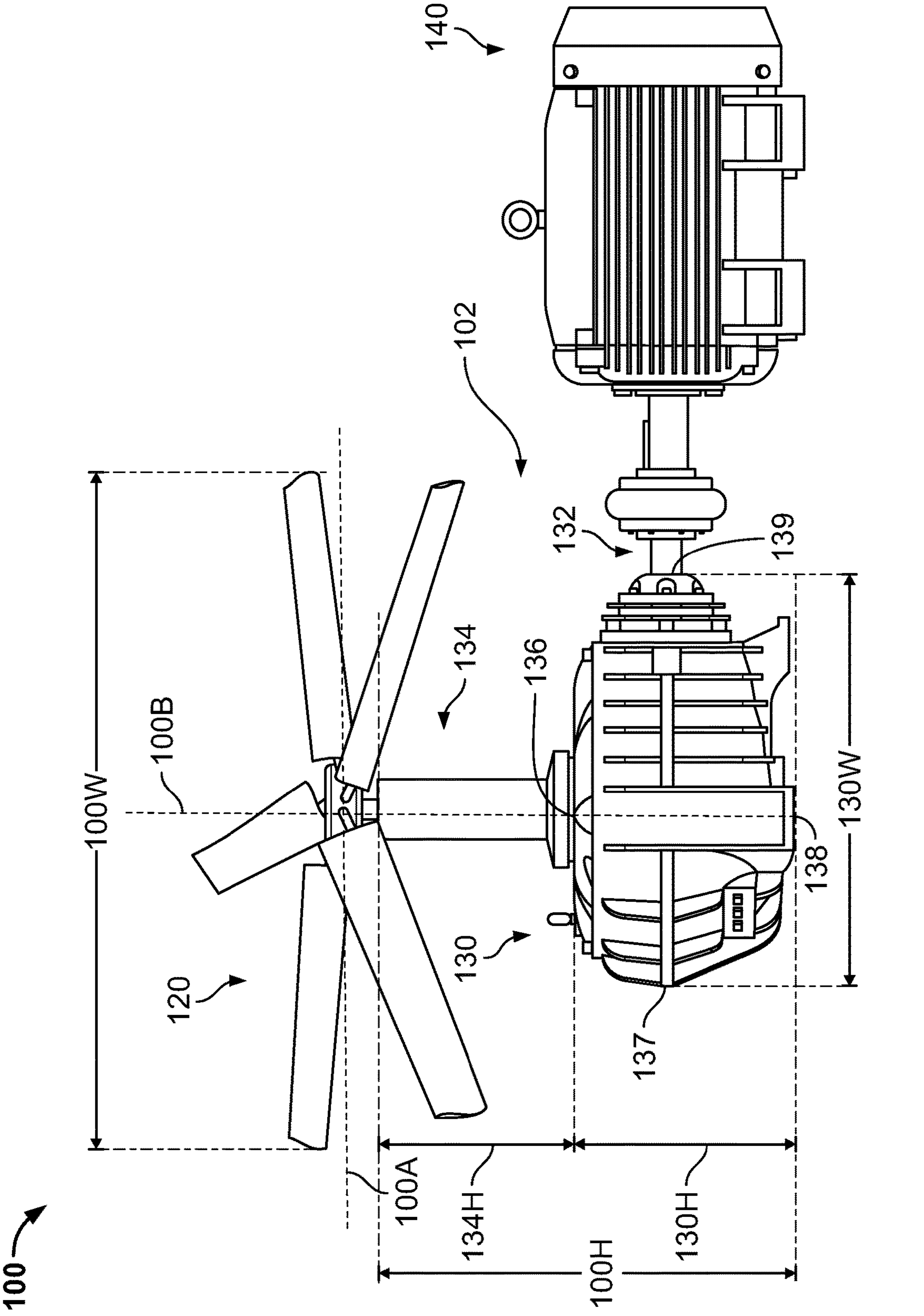
FIG. 1B is a front isometric view of a portion of the conventional cooling tower fan assembly of FIG. 1A.

Referring now to FIGS. 1A and 1B, a conventional heat rejection equipment (e.g., cooling tower) fan assembly 100 is shown. As shown in FIG. 1A, the fan assembly 100 may be attached and/or coupled to at least a portion of a structure 110 provided in the form of an internal support of a heat rejection equipment assembly having a platform 112. The structure 110 may be defined by a structural height dimension 110H defined between a top surface 114 of the structure 110 and an upper surface of the platform 112.

As illustrated best in FIG. 1B, the fan assembly 100 comprises an air movement device, such as a fan 120, an output shaft 134, and/or an induction motor assembly 102. The induction motor assembly 102 is provided in the form of a gear drive 130 in communication with, and disposed below, the fan 120 and/or the output shaft 134, and a motor 140 in communication with the gear drive 130 and extending horizontally outwardly therefrom. In one instance, a variable frequency drive (VFD) (not shown) is in communication with at least one of the motor 140, the induction motor assembly 102, and/or the fan assembly 100 for controlling the speed of the fan 120.

The fan assembly 100 has an overall height dimension 100H as measured between a lowermost surface and an uppermost surface of the fan assembly 100, and a width dimension of 100W as defined by the widest tip length of the fan 120. The height dimension 100H of the fan assembly 100 is substantially equal to or less than the structural height dimension 110H of the structure 110.

The motor 140 may be provided in the form of an induction motor. The gear drive 130 may be positioned between the fan 120 and the motor 140. When the fan assembly 100 is in use, the motor 140 may turn an input shaft 132 of the gear drive 130, which may cause the output shaft 134 of the gear drive 130 to drive the fan 120. The output shaft 134 extends upwardly from a top portion of the gear drive 130 and is coupled to the fan 120. The output shaft 134 is also imparted with a height dimension 134H as measured between the lower surface of the fan 120 and an upper surface of the gear drive 130.

As shown, one or more blades of the fan 120 are positioned in a first horizontal plane, defined by a latitudinal axis 100A. The latitudinal axis 100A corresponds to a latitudinal axis of the fan 120 and extends substantially horizontally with respect to the one or more blades of the fan 120 (e.g., substantially perpendicular to the output shaft 134).

The output shaft 134 is positioned at about a 90-degree angle with respect to the input shaft 132 and with respect to the one or more blades of the fan 120. Thus, as the output shaft 134 drives the fan 120, the one or more blades create an airflow in the first horizontal plane. In one instance, the fan 120 may have fan tip speeds between about 10 meters per minute to about 25,000 meters per minute, or about 100 meters per minute to about 15,000 meters per minute, or about 500 meters per minute to about 12,000 meters per minute. In one instance, the fan tip speed is about 3700 meters per minute. Further, in one instance, one or more blades of the fan 120 may have a diameter of about a 0.5 meter to about 20 meters, or about 1.5 meters to about 6.1 meters, or about 4 meters.

As shown best in FIG. 1B, the motor 140 is also positioned at about a 90-degree angle with respect to a central longitudinal axis 100B corresponding to and/or concurrent with a longitudinal axis of the output shaft 134 and extending substantially perpendicular to the one or more blades of the fan 120.

Referring specifically to FIG. 1B, the dimensions of the gear drive 130 are shown. The gear drive 130 may have a height dimension 130H measured between an uppermost point 136 of the gear drive 130 and a lowermost point 138 of the gear drive 130, wherein the height dimension 130H is measured on an axis parallel to the central longitudinal axis 100B. The central longitudinal axis 100B is substantially perpendicular to the latitudinal axis 100A. The gear drive 130 may also have a width dimension 130W measured between an outermost point of a first side 137 and an outermost point of a second side 139, and further may be imparted with a (e.g., first) volumetric footprint substantially defined by the width, height, and/or depth dimensions of the gear drive 130.

Typically, the height dimension 130H and the width dimension 130W of the gear drive 130 are fixed dimensions determined by the gear drive 130 at the time of installation of the fan assembly 100. Thus, if a consumer replaces the gear drive 130 and/or the motor 140 or wishes to install a motor that does not require the gear drive 130 and/or the motor 140, it may be beneficial for the new piece of equipment or kit to fit within the (e.g., height, width, and/or depth) dimensions and/or the volumetric footprint of the previously installed gear drive 130.

Additionally, it may also be beneficial for the dimensions of a new motor to be substantially the same, or less than, the structural height dimension 110H of the structure 110, since the height dimension 110H of the structure 110 is a fixed dimension at the time of installation of the fan assembly 100. Similarly, if a consumer replaces the fan assembly 100 or wishes to install a motor having a shaft that does not require the gear drive 130, the shaft 134, and/or the motor 140, it may be beneficial for the new equipment or kit to fit within the (e.g., height) dimensions of the previously installed gear drive 130 and the shaft 134.

A consumer may save time and money by replacing the gear drive 130 and/or motor 140 with a motor having similar dimensions because there may be little to no cost associated with retrofitting the system to accept the new motor.

FIGS. 2-5 illustrate various views of a permanent magnet (PM) motor assembly or PM motor 200. The PM motor 200 is designed to couple to the platform 112 of the structure 110 and replace a traditional induction motor. The PM motor 200 is provided as an assembly and/or a retrofit kit designed to fit within the volumetric footprint and/or the dimensions of the gear drive 130 and/or within the structural height dimension 110H of the structure 110. In one instance, the VFD may be in communication with the PM motor 200 for fan speed control. The VFD is a motor controller that drives an electric motor, such as the PM motor, by controlling the speed and torque through varying the frequency and voltage of its power supply (e.g., input electricity), which in turn controls the fan speed.

In this way, the dimensions of the PM motor 200 may be substantially equivalent to, or less than the dimensions of the gear drive 130 provided in prior art systems. Additionally, the PM motor 200 may have a second volumetric footprint substantially defined by the width, height, and/or depth dimensions of the motor 200. The second volumetric footprint of the PM motor 200 may be substantially equivalent to, or less than, the first volumetric footprint of the gear drive 130 of prior art systems.

Figure 2:
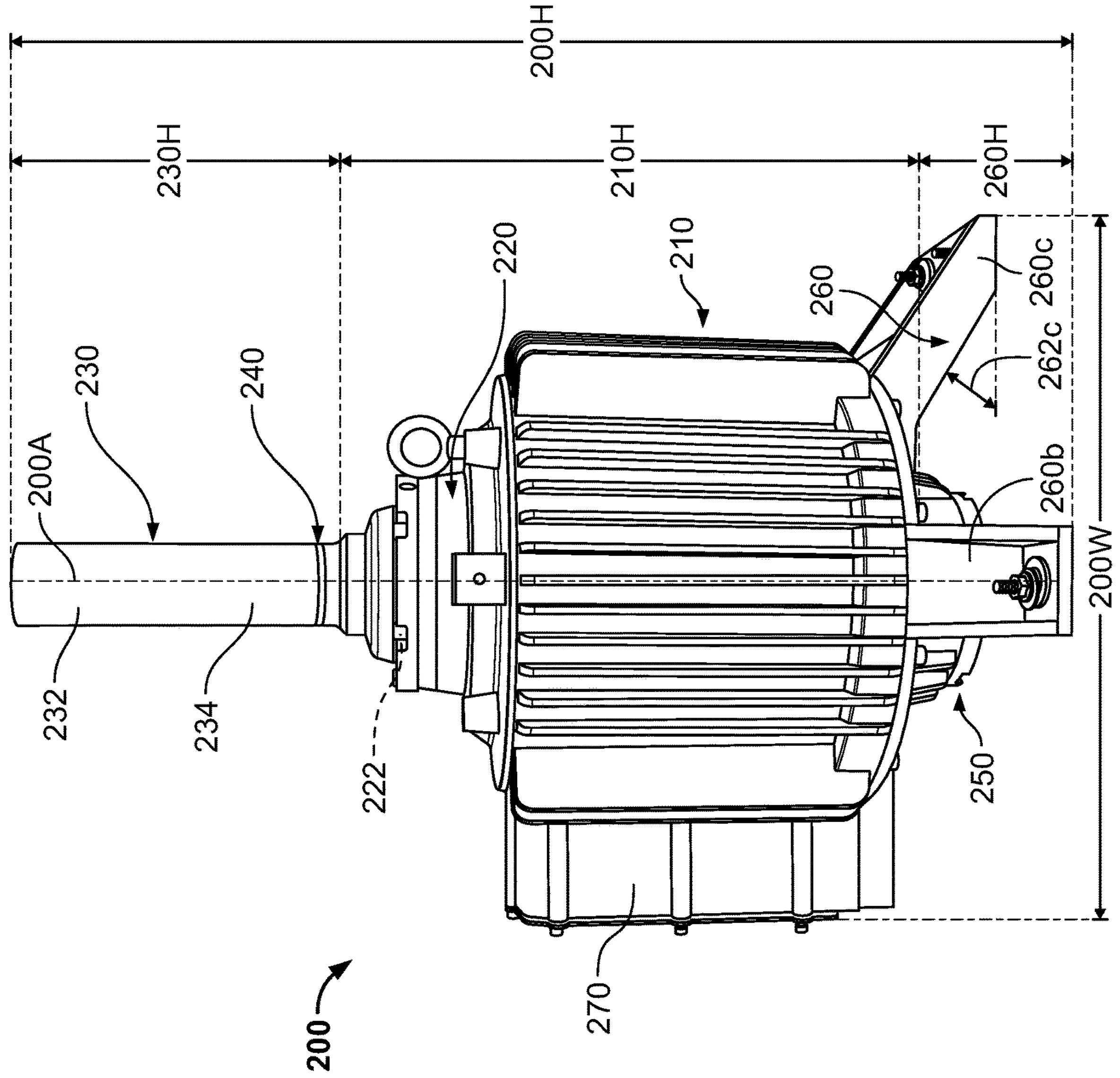
FIG. 2 is a left side isometric view of a PM motor assembly, the right side view being a mirror image thereof.
Figure 3:
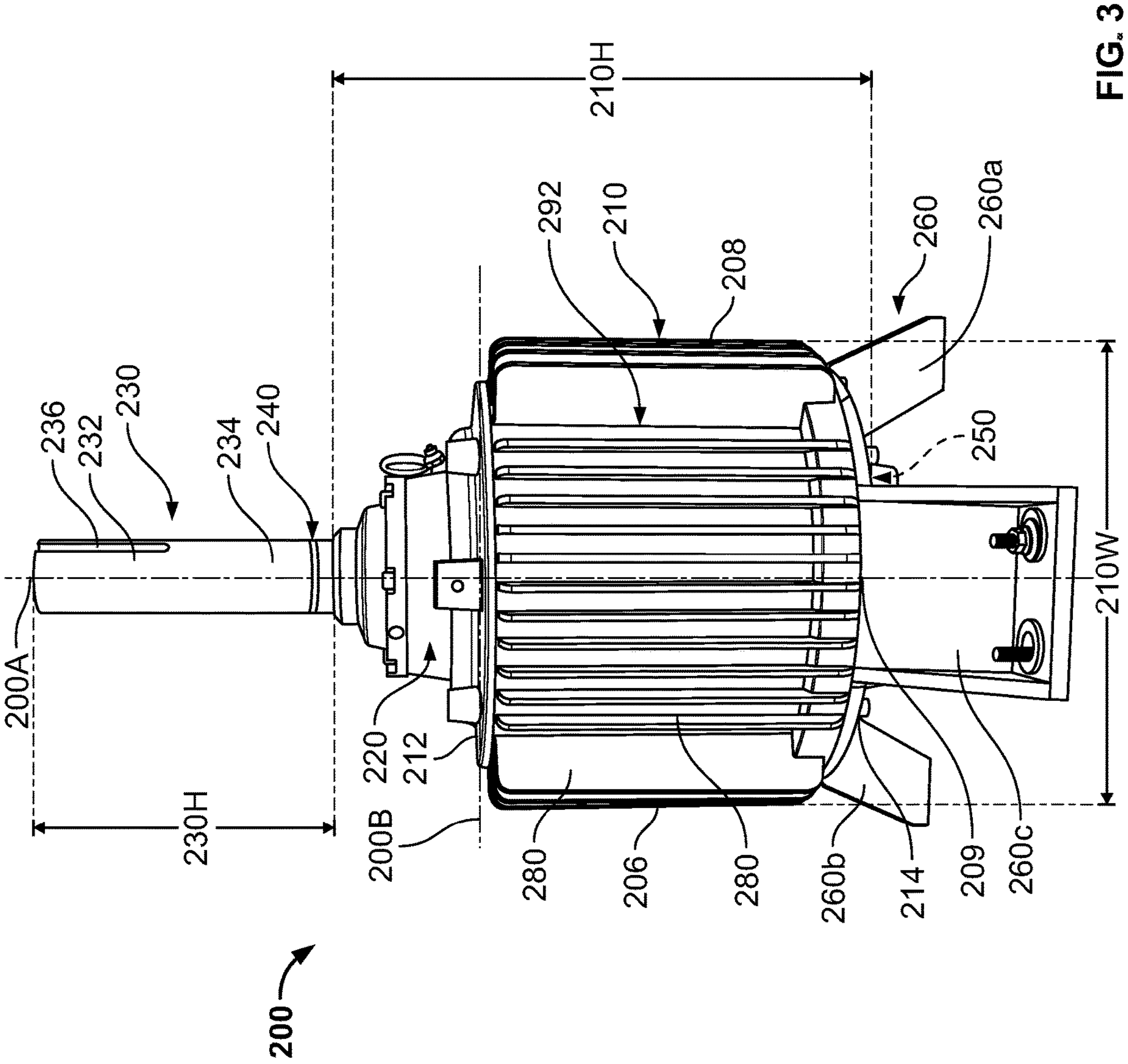
FIG. 3 is a rear side isometric view of the PM motor assembly of FIG. 2.

FIGS. 2 and 3 illustrate isometric side views of the PM motor 200. As shown, the PM motor 200 may have a body 210 that at least partially encloses various (e.g., operational) components of the PM motor 200. An upper bearing housing 220 protrudes upwardly from an upper portion of the body 210. A shaft 230 extends upwardly from the upper bearing housing 220 and is configured to couple to an air movement device (e.g., the fan 120). A water slinger 240 is substantially located between the upper bearing housing 220 and the shaft 230, and disposed within an interior thereof. A lower bearing housing 250 protrudes downwardly from a lower end of the body 210. A mounting assembly 260 is disposed on a lower end of the body 210 and substantially encircles at least a portion of the lower bearing housing 250 and extends outwardly therefrom. A rectilinear control box 270 is connected to and extends outwardly from the body 210.

As discussed herein and shown in FIG. 2, the PM motor 200 may have an overall height dimension 200H that is defined by the sum of a height dimension 230H of the shaft 230, a height dimension 210H of the body 210, and a height dimension 260H of the mounting assembly 260. In one instance, the overall height dimension 200H is designed to be less than the structural height dimension 110H of the structure 110 and/or less than the height dimension 100H.

As best shown in FIG. 3, the shaft 230 is designed to extend and couple between an air movement device (e.g., the fan 120) and the upper bearing housing 220 to facilitate alignment and supporting the thrust and/or the axial load produced by the air movement device during its operation. The shaft 230 may be imparted with substantially the same dimensions as a shaft (e.g., the output shaft 134) of a conventional motor assembly (e.g., assembly 100) so that the air movement device (e.g., the fan 120) of the conventional motor assembly may readily be used with and couple to the PM motor 200 via the shaft 230.

The height dimension 230H of the shaft 230 is measured to be substantially parallel to and correspond to the central longitudinal axis 200A. In some instances, the height dimension 230H of the shaft 230 may be greater than the height dimension 134H of the output shaft 134. In other instances, the height dimension 230H may be less than, or substantially equal to, the height dimension 134H of the shaft 134 of the assembly 100. Alternatively, the shaft 230 may be imparted with any shape or size suitable to support the thrust and/or axial load of a heat rejection equipment fan.

Additionally, the shaft 230 may provide clearance between, for example, the fan 120 and the body 210 of the PM motor 200. The height dimension 230H of the shaft 230 may be provided as a minimum height sufficient to prevent interference between one or more blades of the fan 120 and the body 210 and/or other components of the PM motor 200 when the PM motor 200 and/or the heat rejection equipment is in use.

As best shown in FIG. 3, the shaft 230 may be provided in the form of a unitary piece defined by an upper shaft portion 232 and a lower shaft portion 234. The lower shaft portion 234 may provide stability to the upper shaft portion 232 and is positioned between the upper shaft portion 232 and the upper bearing housing 220. The upper shaft portion 232 may further include a keyway 236 to facilitate coupling a portion of an air movement device (e.g., the fan 120) to the shaft 230. The upper shaft portion 232 may be tapered in the z-direction, and the lower shaft portion 234 may have a substantially cylindrical shape with a substantially constant outer diameter.

An optional water slinger 240 may be positioned around and circumscribe a base of the lower shaft portion 234 proximal to the upper bearing housing 220. The water slinger 240 is designed to help prevent water and contaminants from sliding down the shaft 230 and contacting or wetting the internal components of the PM motor 200. In some instances, the water slinger 240 may function by repelling water or moisture away from the shaft 230, body 210, and/or other components of the PM motor 200. Additionally, in some instances, the water slinger 240 may have an angled surface and include a lip seal, and/or other sealing mechanism.

Continuing with FIGS. 2 and 3, the upper bearing housing 220 may support and/or stabilize the shaft 230 and facilitate coupling the shaft 230 to the body 210. The upper bearing housing 220 may include one or more openings in a top surface thereof to receive at least one bearing retainer (e.g., a coupling mechanism) 222 (shown in FIG. 5), such as one or more bolts, therein. The one or more bearing retainers 222 may help secure the upper bearing housing 220 to the body 210. In one instance, the upper bearing housing 220 may include six bearing retainers 222 that are evenly spaced and disposed near the periphery of the upper bearing housing 220, thereby encircling at least a portion, or all, of the shaft 230. In other instances, the upper bearing housing 220 may include more or fewer openings and/or corresponding bearing retainers 222.

The body 210 of the PM motor 200 is designed to retain one or more internal components (not shown) of the PM motor 200. As illustrated, in one instance, the body 210 may be provided in an approximately cylindrical shape. However, it is to be understood that in some instances, the body 210 may be rectangular, oval, or other shape known in the art. The PM motor 200 may include typical components, such as a stator coil or ring, powered by an alternating current that creates an electric field so that a rotor (e.g., provided in the form of high energy magnetic material) rotates within the electric field.

The body 210 of the PM motor 200 is defined by the height dimension 210H between an upper most portion of an upper surface 212 and a lowermost portion of a lower surface 214 of the body 210, which may be measured substantially parallel and corresponding to the central longitudinal axis 200A. In some instances, the height dimension 210H of the body 210 may be approximately equal to, or less than, the height dimension 130H of the gear drive 130 and/or the height dimension 100H of prior art induction motor systems, and/or the structural height dimension 110H of the structure 110 of the heat rejection equipment. In other instances, the height dimension 210H of the body 210 may be greater than the height dimension 130H of the gear drive 130 and/or the height dimension 100H and/or the height dimension 110H.

The PM motor 200 may also have a latitudinal axis 200B (see FIG. 3), which is substantially perpendicular to the shaft 230 and/or to the central longitudinal axis 200A. The body 210 of the PM motor 200 may have a width dimension 210W measured parallel to the latitudinal axis 200B and defined between an outermost point of a first side 206 and an outermost point of an opposing second side 208. In some instances, the width dimension 210W of the body 210 of the PM motor 200 may be approximately equal to, or less than, the width dimension 130W of the gear drive 130 of prior art induction motor systems and may be designed to couple to the platform 112 of the structure 110.

A sidewall 292 of the body 210 may include a first plurality of radial fins 280 extending outwardly therefrom. The first plurality of fins 280 may be connected to and protrude outwardly from the sidewall 292 of the body 210 in various directions and circumscribe a portion, the majority, or all of the exterior of the body 210. The first plurality of fins 280 is designed to assist in cooling the PM motor 200 by facilitating heat transfer. Although the first plurality of fins 280 is shown as approximately rectilinear in shape and extending at an approximately 90-degree angle from the sidewall 292 of the body 210, it is to be understood that the first plurality of fins 280 may be provided in other shapes and sizes and may be arranged about the sidewall 292 of the body 210 in other configurations. Further, the first plurality of fins 280 may have more or fewer fins depending on the embodiment and may be spaced in a uniform, or a discontinuous manner around the periphery of the body 210.

Figure 4:
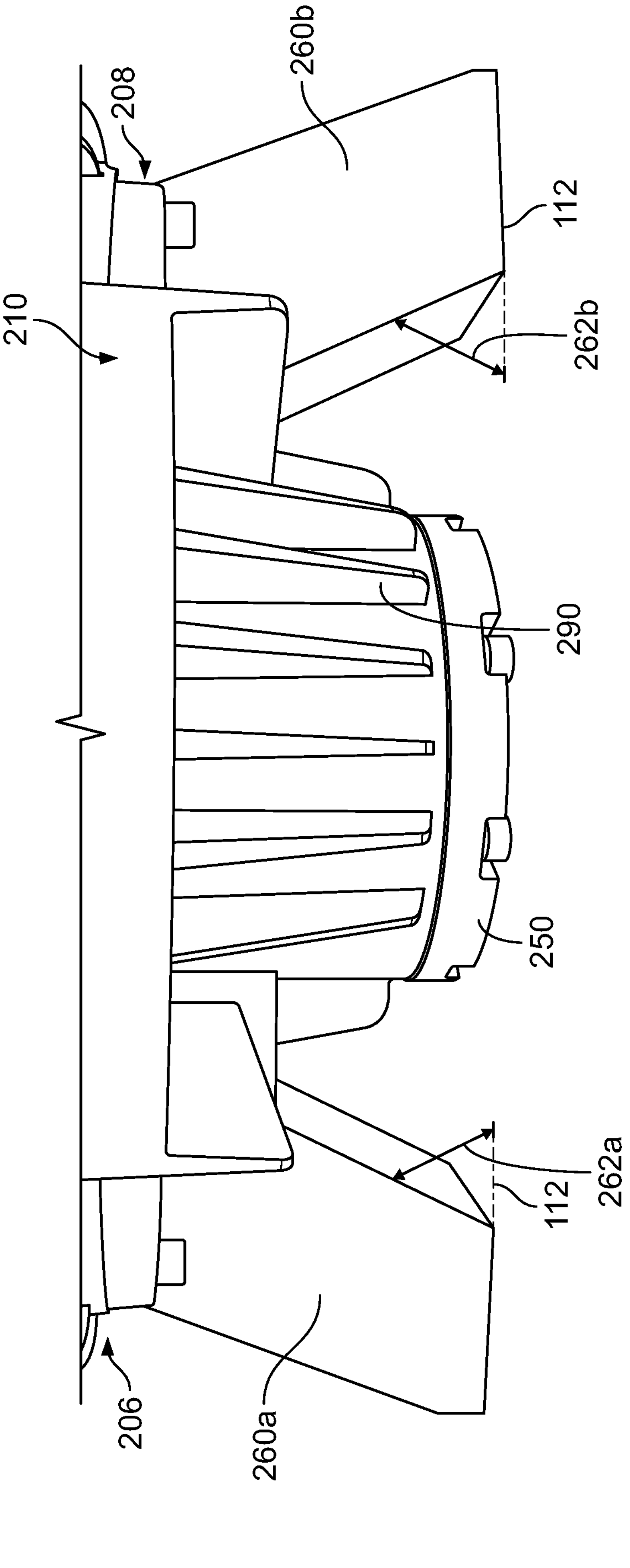
FIG. 4 is a partial isometric view illustrating a lower portion of the PM motor assembly of FIG. 2.

Turning to FIG. 4, a close-up view of a bottom region of the PM motor 200 is illustrated, showing the lower bearing housing 250 and the mounting assembly 260 in detail. The lower bearing housing 250 is disposed on an opposite side of the body 210 as compared to the upper bearing housing 220 and is designed to provide additional support and stability to the PM motor 200 and/or the air movement device (e.g., the fan 120) during operation. More specifically, the lower bearing housing 250 extends downwardly and outwardly from the lower surface 214 of the body 210.

The lower bearing housing 250 may include at least one rotary bearing (not shown), such as a thrust bearing, disposed therein. The rotary bearing is designed to support the axial and/or thrust loads imposed by the weight of the components of the PM motor 200, the rotor of the PM motor 200 (not shown), the weight of the air movement device (e.g., the fan 120) being driven by the PM motor 200, the air load, and/or other sources of axial and/or thrust load. Moreover, in some instances, there may be space between the bottom of the lower bearing housing 250 and the platform

112 of the structure 110 to prevent interference between the lower bearing housing 250 and the platform 112 during operation of the PM motor 200. In other instances, the lower bearing housing 250 may be substantially flush (e.g., with little to no clearance) with the platform 112 of the structure 110 when the PM motor 200 is installed.

Figure 5:
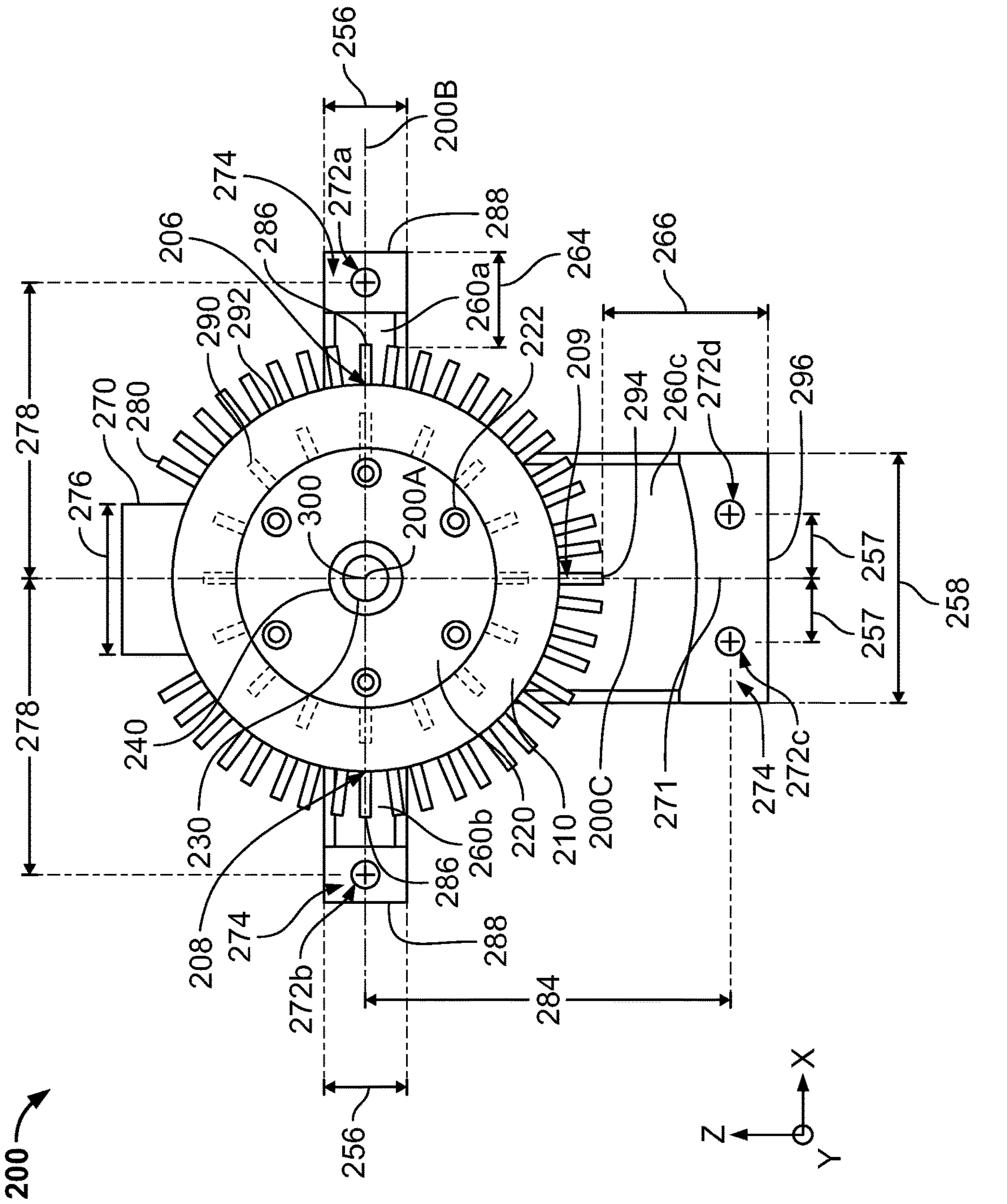
FIG. 5 is a top plan view of the PM motor assembly of FIG. 2.

As shown in FIGS. 4 and 5, the PM motor 200 may include a second plurality of elongated fins 290 connected to and extending outwardly from the lower bearing housing 250. The second plurality of fins 290 may have the same design (e.g., shape, configuration, spacing, size, etc.) as the first plurality of fins 280. Alternatively, the second plurality of fins 290 may be provided as a different structure or design with respect to the first plurality of fins 280. In one instance, the first plurality of fins 280 may protrude outwardly from the body 210 in a first configuration, and the second plurality of fins 290 may protrude outwardly from the lower bearing housing 250 in a second configuration, whereby the first plurality of fins 280 and the second plurality of fins 290 are offset with respect to each other. In some instances, the first plurality of fins 280 are substantially rectangular (and may include an L-shaped notch at a bottom thereof) and extend substantially the entire length of the body 210, while the second plurality of fins 290 are elongated and taper inwardly from a top portion of each fin 290 to a bottom surface of each fin 290.

Additionally, the PM motor 200 may include the mounting assembly 260 provided in the form of at least three discrete legs 260*a*, 260*b*, and/or 260*c*. Each of the legs 260*a*-260*c* may be attached to at least a portion of the body 210 and/or the lower bearing housing 250 and extend outwardly therefrom. Alternatively, the mounting assembly 260 may be provided with any number of legs, wherein each leg may be substantially the same shape, size, and/or orientation as another leg or may be different than the other legs.

Referring to FIGS. 4 and 5, the first leg 260*a* may be positioned on and extend from a first side 206 of the body 210 at an angle 262*a*, and the second leg 260*b* may be positioned on and extend from a second side 208 of the body 210 at angle 262*b*. The third leg 260*c* may be positioned on and extend from a third side 209 of the body 210 at an angle 262*c* (shown in FIG. 2), the third side 209 being positioned approximately between and in the middle of the first side 206 and the second side 208. In one instance, the angles 262*a*, 262*b* of the first and second legs 260*a*, 260*b* are the same acute angle, and the angle 262*c* is also an acute angle but is less than the angle 262*a* and/or 262*b*. For example, the angles 262*a* and 262*b* may be between about 10 degrees and about 90 degrees, or about 20 degrees to about 60 degrees, or about 45 degrees, and the angle 262*c* may be between about 10 degrees and about 90 degrees, or about 20 degrees to about 60 degrees, or about 35 degrees. In other instances, the angles 262*a*-262*c* of the legs 260*a*-260*c* may all be substantially the same or may all be different from one another.

Referring specifically to FIG. 5, in one instance, the first leg 260*a* and the second leg 260*b* may be substantially equivalent in shape and size having a first width 256, a first cross-sectional profile, and a first surface area (e.g., the area of the leg 260*a* and/or 260*b* that contacts the platform 112), whereas the third leg 260*c* may be imparted with a second width 258, a second cross-sectional profile, and a second surface area (e.g., the area of the leg 260*c* that contacts the platform 112). In one instance, the first width 256 of the first and second legs 260*a*, 260*b* may be wider than the second width 258 of the third leg 260*c*. Further, the second surface area of the third leg 260*c* may be larger than the first surface area of the first and second legs 260*a*, 260*c* to provide stability to the PM motor 200 on the platform 112 and to counteract the weight of the control box 270.

The first leg 260 and/or the second leg 260*b* may protrude outwardly from at least one fin 280 a distance 264 that is measured between an outer surface 286 of at least one fin 280 and an outer edge or surface 288 of the first leg 260*a* and/or the second leg 260*b*. Further, the third leg 260*c* may protrude outwardly from at least one fin 280 a distance 266 that is measured between an outer surface 294 of at least one fin 280 and an outer edge or surface 296 of the third leg 260*c*, such that the distance 266 is greater than the distance 264. In one instance, if each of the plurality of fins 280 are substantially the same size and shape, then the distance 266 may be measured between the outer surface 286 of at least one fin 280 and the outer surface 296 of the third leg 260*c*.

As shown in FIG. 5, the central longitudinal axis 200A (e.g., the y-axis of FIG. 5) may define a center point 300 of the shaft 230 at the intersection between the latitudinal axis 200B (e.g., the x-axis of FIG. 5) and a vertical axis 200C (e.g., the z-axis of FIG. 5). Each of the legs 260*a*-260*c* may be aligned with (e.g., the center point 300 of) the shaft 230. For example, a center of the first leg 260*a* may be marked by a first attachment point 272*a* (e.g., positioned along the latitudinal axis 200B), a center of the second leg 260*b* is marked by a second attachment point 272*b* (e.g., positioned along the latitudinal axis 200B), and a center 271 of the third leg 260*c* is marked between a third attachment point 272*c* and a fourth attachment point 272*d* (e.g., with the center 271 positioned along the vertical axis 200C).

In one instance, each of the first attachment point 272*a* and the second attachment point 272*b* may be provided at a distance 278 from the vertical axis 200C to provide stability and/or to distribute the weight and/or the load of the PM motor 200 and the fan 120 between the legs 260*a* and 260*b*. Alternatively, the first attachment point 272*a* may be provided at a different distance from the vertical axis 200C than that of the second attachment point 272*b*.

Additionally, the third attachment point 272*c* and fourth attachment point 272*d* may both be separated from the vertical axis 200C by a distance 257. Alternatively, the third attachment point 272*c* and the fourth attachment point 272*d* may be separated from the vertical axis 200C by different distances.

The third leg 260*c* may protrude outwardly from the body 210 a distance 284 that is measured between the latitudinal axis 200B or the second attachment point 272*b* and the third attachment point 272*c* and/or the fourth attachment point 272*d*. In one instance, the third leg 260*c* may protrude outwardly from the body 210 further than the first leg 260*a* and/or the second leg 260*b* protruding from the body 210, such that the distance 284 is greater than the distance 278.

Continuing with FIG. 5, the first, second, third, and fourth attachment points 272*a*-272*d* may be collectively referred to as the attachment points 272. In one instance, the attachment points 272 facilitate coupling each leg 260*a*-260*c* of the mounting assembly 260 to a portion of a structure (e.g., the platform 112 of the structure 110 of FIGS. 1A and 1B).

In one instance, the attachment points 272 are provided in the form of an opening designed to permit a coupling mechanism, such as a screw, bolt, or other similar device to be inserted therethrough. The openings may be provided in one or more of the legs 260*a*-260*c* and extend entirely through a portion of a surface 274 of one or more of the legs 260*a*-260*c*. To allow for easy installation, the attachment points 272 may align with existing attachment points of a gear drive (e.g., the gear drive 130 of FIGS. 1A and 1B). It is to be understood that each of the legs 260*a*-260*c* may have more or fewer attachment points 272 depending on the embodiment.

Additionally, the PM motor 200 includes the control box 270 extending outwardly from the sidewall 292 of the body 210 and is located between the first and second legs 260*a*, 260*b*, and opposite the third leg 260*c*. The control box 270 may have a width dimension 276. As shown, the width dimension 276 of the control box 270 may be less than the second width 258 of the third leg 260*c*. However, in some instances, the width dimension 276 of the control box 270 may be substantially the same as or greater than the second width 258 of the third leg 260*c*.

The control box 270 may retain one or more internal components such as a control system for controlling the operation of the PM motor 200, electrical controls, mechanical controls, an electrical disconnect (e.g., an on/off switch), and/or other components to facilitate the operation of the PM motor 200. Additionally, in some instances, the control box 270 may have an internal power source to power the PM motor 200. In other instances, the control box 270 may include an outlet designed to receive an external power source to power the PM motor 200.

A method of replacing a fan assembly 100 and/or an induction motor assembly 102 having a gear drive 130 in heat rejection equipment may include a number of exemplary steps.

The first step may be removing the motor 140 and/or the gear drive 130 having the height dimension 130H, from the platform 112 and/or the structure 110 of the heat rejection equipment. The step may further include removing the gear drive 130 and the shaft 134 having the height dimension 100H from the platform 112. Moreover, this step may include removing the fan 120 from the heat rejection equipment.

Next, the method includes providing the PM motor 200. The PM motor 200 is imparted with an overall height dimension 200H that is less than or substantially equal to the height dimension 130H of the gear drive 130 and/or that is less than or substantially equal to the height dimension 100H. The PM motor 200 is provided with the body 210, the upper bearing housing 220 (e.g., positioned on the upper surface 212 of the body 210), the shaft 230 connected to and extending from the upper bearing housing 220, the lower bearing housing 250 positioned on a lower surface 214 of the body 210 opposite the upper surface 212, and the mounting assembly 260 disposed on a lower end and/or the lower surface 214 of the body 210 and configured to couple the PM motor 200 to the platform 112 of the structure 110.

The method may also include the step of replacing the induction motor assembly 102 having the gear drive 130 with the PM motor 200, and/or the step of mounting the PM motor 200 to the heat rejection equipment by aligning a set of attachment points of the gear drive 130 of the induction motor assembly 102 the attachment points 272 of the PM motor 200, and coupling the PM motor 200 to the platform 112 of the structure 110 with at least one bearing retainer 222.

Several example embodiments will now be discussed. Referring to the measurements defined in FIGS. 2 and 5, the following example embodiments provide dimensional aspects of PM motors designed to be retrofitted into a footprint of a previously utilized gear drive and replace various sizes of gear drives. The PM motors in the examples below may be the PM motor 200 of FIGS. 2-5. The gear drive may be the gear drive 130 of FIGS. 1A and 1B. It is to be understood that the below embodiments are exemplary only and are not to be considered limiting.

Example 1

In one instance, the PM motor may be designed to replace a gear drive (e.g., a 2000 Geareducer® made and sold by SPX Cooling Tech, LLC), wherein the PM motor may be a 10 horsepower (hp) motor or a 40 hp motor. The 10 hp PM motor and the 40 hp PM motor may have the same dimensions. Therefore, the following example will refer to a 40 hp PM motor, but it is to be understood that the details described therein may be equally applicable to a 10 hp PM motor.

First referring to the measurements defined in FIG. 2, the 40 hp PM motor may have an overall height dimension 200H of about 25 centimeters to about 200 centimeters, or about 66 centimeters to about 74 centimeters. For example, the overall height dimension 200H of the 40 hp PM motor may be about 70.4 centimeters.

Additionally, the shaft 230 of the 40 hp PM motor may have a height dimension 230H that is about 10 centimeters to 40 centimeters, or about 19 centimeters to 26 centimeters. For example, the shaft 230 of the 40 hp PM motor may have a height dimension 230H of about 22.4 centimeters.

The body 210 and mounting assembly 260 of the 40 hp motor may each have height dimensions 210H and 260H, respectively, that add up to a value of about 20 centimeters to about 70 centimeters, or about 40 centimeters to about 60 centimeters. For example, the height dimension 210H of the body 210 and the height dimension 260H of the mounting assembly 260 of the 40 hp motor may add up to a value of about 48 centimeters. Similar to the PM motor 200 depicted in FIG. 2, the 40 hp PM motor may be symmetrical about the central longitudinal axis 200A.

Now referring to the measurements shown in FIG. 5, in the present embodiment, each of the first and second attachment points 272*a*, 272*b* may be offset from the vertical axis 200C in the x-direction by a distance 278, wherein the distance 278 is about 5 centimeters to about 40 centimeters, or about 15 centimeters to about 25 centimeters. For example, the distance 278 may be about 17.8 centimeters.

Additionally, the third and fourth attachment points 272*c*, 272*d* may be offset from the vertical axis 200C in the x-direction by a distance 257, wherein the distance 257 is about 0.5 centimeters to about 10 centimeters, or about 2 centimeters to about 5 centimeters. For example, the distance 257 may be about 3.7 centimeters. Finally, the third and fourth attachment points 272*c*, 272*d* may be offset from the latitudinal axis 200B in the z-direction by a distance 284, wherein the distance 284 is about 5 centimeters to about 40 centimeters, or about 15 centimeters to about 30 centimeters. For example, the distance 284 may be about 25.3 centimeters.

The 40 hp motor of this example may be capable of efficiently handling radial loads and axial loads.

Example 2

In another instance, the PM motor may be designed to replace a gear drive (e.g., a 2250 Geareducer® made and sold by SPX Cooling Tech, LLC), wherein the PM motor may be a 75 hp motor.

First referring to the measurements defined in FIG. 2, the 75 hp PM motor may have an overall height dimension 200H of about 20 centimeters to about 200 centimeters, or about 30 centimeters to about 150 centimeters. For example, the overall height dimension 200H of the 75 hp PM motor may be about 77.3 centimeters. Additionally, the shaft 230 of the 75 hp PM motor may have a height dimension 230H is about 5 centimeters to about 100 centimeters, or 10 centimeters to about 40 centimeters. For example, the shaft 230 of the 75 hp PM motor may have a height dimension 230H of about 24.6 centimeters. Similar to the motor 200 depicted in FIG. 2, the PM motor may be symmetrical about a central longitudinal axis 200A.

Now referring to the measurements defined in FIG. 5, in the present embodiment, each of the first and second attachment points 272*a*, 272*b* may be offset from the central longitudinal axis 200A in the x-direction by a distance 278, wherein the distance 278 is about 5 centimeters to about 50 centimeters, or about 15 centimeters to about 40 centimeters. For example, the distance 278 may be about 25.4 centimeters.

Additionally, each of the third and fourth attachment points 272*c*, 272*d* may be offset from the vertical axis 200C in the x-direction by a distance 257, wherein the distance 257 is about 0.5 centimeters to about 25 centimeters, or about 1 centimeters to about 10 centimeters. For example, the distance 257 may be about 3.7 centimeters. Finally, the third and fourth attachment points 272*c*, 272*d* may be offset from the latitudinal axis 200B in the z-direction by a distance 284, wherein the distance 284 is about 5 centimeters to about 100 centimeters, or about 15 centimeters to about 50 centimeters. For example, the distance 284 may be about 32.9 centimeters.

The 75 hp motor of this example may be capable of efficiently handling radial loads and axial loads.

Example 3

In another instance, the PM motor may be designed to replace a gear drive (e.g., a 32 Geareducer® made and sold by SPX Cooling Tech, LLC), wherein the PM motor may be a 150 hp motor.

First referring to the measurements defined in FIG. 2, the 150 hp PM motor may have an overall height dimension 200H is about 30 centimeters to about 200 centimeters, or about 50 centimeters to about 90 centimeters. For example, the 150 hp PM motor may have an overall height dimension 200H is about 83.2 centimeters. Additionally, the shaft 230 of the 150 hp PM motor may have a height dimension 230H is about 5 centimeters to about 50 centimeters, or about 10 centimeters to about 40 centimeters. For example, the shaft 230 of the 150 hp PM motor may have a height dimension 230H of about 26.5 centimeters. Similar to the motor 200 depicted in FIG. 2, the PM motor may be symmetrical about a central longitudinal axis 200A.

Now referring to the measurements defined in FIG. 5, in the present embodiment, each of the first and second attachment points 272*a*, 272*b* may be offset from the central longitudinal axis 200A in the x-direction by a distance 278, wherein the distance 278 is about 5 centimeters to about 50 centimeters, or about 15 centimeters to about 40 centimeters. For example, the distance 278 may be about 30.5 centimeters. Additionally, each of the third and fourth attachment points 272*c*, 272*d* may be offset from the vertical axis 200C in the x-direction by a distance 257, wherein the distance 257 is about 0.5 centimeters to about 20 centimeters, or about 1 centimeters to about 10 centimeters. For example, the distance 257 may be about 4.5 centimeters. Finally, the third and fourth attachment points 272*c*, 272*d* may be offset from the latitudinal axis 200B in the z-direction by a distance 284, wherein the distance 284 is about 5 centimeters to about 100 centimeters, or about 30 centimeters to about 50 centimeters. For example, the distance 284 may be about 45.7 centimeters.

The 150 hp motor of this example may be capable of efficiently handling radial loads and axial loads.

Example 4

In another instance, the PM motor may be designed to replace a gear drive (e.g., a 32 Geareducer® made and sold by SPX Cooling Tech, LLC), wherein the PM motor may be a 150 hp motor. The 150 hp PM motor of Example 4 is the same as the 150 hp PM motor of Example 3; however, the attachment points 272 vary. Here, each of the three legs 260*a*-260*c* includes two attachment points 272. Thus, similar to the third leg 260*c*, the first and second legs 260*a*, 260*b* may each include two attachment points 272 (not shown). In this instance, each of the two attachment points 272 of the first and second legs 260*a*, 260*b* may be offset from the latitudinal axis 200B by a distance of about 1 centimeter to about 15 centimeters, or about 2 centimeters to about 6 centimeters, or about 4 centimeters. In this instance, the two attachment points 272 of each of the first and second legs 260*a*, 260*b* may be offset from the latitudinal axis 200B in the same way the third and fourth attachment points 272*c*, 272*d* of FIG. 5 are each offset from the vertical axis 200C by the distance 257 as shown in FIG. 5.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A permanent magnet motor to facilitate air movement through heat rejection equipment, comprising:
- a body;
- an upper bearing housing positioned on and extending upwardly from a top surface of the body;
- a shaft connected to and extending from the upper bearing housing and in communication with a fan;
- a lower bearing housing positioned on and extending downwardly from a bottom surface of the body opposite the top surface; and
- a mounting assembly having at least three discrete legs disposed on a lower end of the body and extending outwardly from the body.

2. The permanent magnet motor of claim 1 further comprising a water slinger substantially disposed between the upper bearing housing and the shaft.

3. The permanent magnet motor of claim 1 further comprising a first plurality of fins connected to and protruding outwardly from a surface of the body.

4. The permanent magnet motor of claim 3 further comprising a second plurality of fins connected to and protruding outwardly from the lower bearing housing, wherein the second plurality of fins is offset from the first plurality of fins and is imparted with a different shape with respect to the first plurality of fins.

5. The permanent magnet motor of claim 1, wherein the mounting assembly encircles at least a portion of the lower bearing housing and extends outwardly therefrom.

6. The permanent magnet motor of claim 1, wherein at least two of the three discrete legs are positioned on opposing sides of the body, and each of the three discrete legs is oriented in alignment with the shaft.

7. The permanent magnet motor of claim 1, wherein each of the three discrete legs includes at least one attachment point designed to couple the permanent magnet motor to the heat rejection equipment.

8. The permanent magnet motor of claim 7, wherein the at least one attachment point of one leg is positioned a first distance from the shaft and the at least one attachment point of another leg is positioned a second distance further from the shaft than the at least one attachment point of the first leg.

9. The permanent magnet motor of claim 7, wherein the at least one attachment point of one leg is positioned a first distance from the shaft and the at least one attachment point of another leg is positioned at the first distance.

10. The permanent magnet motor of claim 1 further comprising a control box for providing power to the motor and protruding outwardly from a side of the body.

11. A permanent magnet motor provided as a retrofit kit for an induction motor assembly, comprising:
- a cylindrical body at least partially enclosing at least one component of the permanent magnet motor;
- an upper bearing housing protruding upwardly from an upper portion of the body;
- a shaft extending upwardly from the upper bearing housing;
- a lower bearing housing protruding downwardly from a lower end of the body; and
- a mounting assembly disposed on a lower end of the body and substantially encircling and extending outwardly from the lower bearing housing,
- wherein the volumetric footprint defining the permanent magnet motor is substantially equivalent to, or less than the volumetric footprint of the induction motor assembly.

12. The permanent magnet motor of claim 11, wherein the permanent magnet motor is defined by a first height dimension, and the induction motor assembly is defined by a second height dimension that is equal to or greater than the first height dimension of the permanent magnet motor.

13. The permanent magnet motor of claim 11, wherein the induction motor assembly comprises a first set of attachment points and the mounting assembly of the permanent magnet motor comprises a second set of attachment points designed to align with the first set of attachment points.

14. The permanent magnet motor of claim 11, further comprising a water slinger substantially disposed between the upper bearing housing and the shaft.

15. The permanent magnet motor of claim 11, wherein the shaft provides alignment and a clearance between the upper bearing housing and a fan.

16. The permanent magnet motor of claim 11, wherein the mounting assembly comprises three discrete legs extending outwardly from the body or the lower bearing housing.

17. The permanent magnet motor of claim 11, wherein the lower bearing housing supports a rotary bearing disposed therein, the rotary bearing is designed to support axial and thrust loads equal to or greater than the induction motor gear drive.

18. A method of replacing an induction motor having a gear drive in heat rejection equipment, the method comprising:
- removing the induction motor having a first height dimension;
- providing a permanent magnet motor having a second height dimension that is less than or equal to the first height dimension, the permanent magnet motor comprising:
  - a body;
  - an upper bearing housing positioned on a top surface of the body;
  - a shaft connected to and extending from the upper bearing housing;
  - a lower bearing housing positioned on a bottom surface of the body opposite the top surface; and
  - a mounting assembly disposed on a lower end of the body and configured to couple the permanent magnet motor kit to the heat rejection equipment; and
- replacing the induction motor having the gear drive with the permanent magnet motor.

19. The method of claim 18 further comprising mounting the permanent magnet motor to the heat rejection equipment by aligning a set of attachment points of the induction motor gear drive with another set of attachment points of the permanent magnet motor, and coupling the permanent magnet motor to the heat rejection equipment with at least one coupling mechanism.

20. The method of claim 18, wherein the mounting assembly has at least three discrete legs disposed on the lower end of the body, and at least one of the three discrete legs is imparted with a wider cross-sectional profile than the other two discrete legs.

* * * * *